3,256,061
RECOVERY OF HYDROGEN FLUORIDE
Lewis E. Tufts, John T. Rucker, and Theodore H. Dexter, Lewiston, N.Y., assignors to Hooker Chemical Corporation, Niagara Falls, N.Y., a corporation of New York
Filed June 14, 1962, Ser. No. 202,539
12 Claims. (Cl. 23—153)

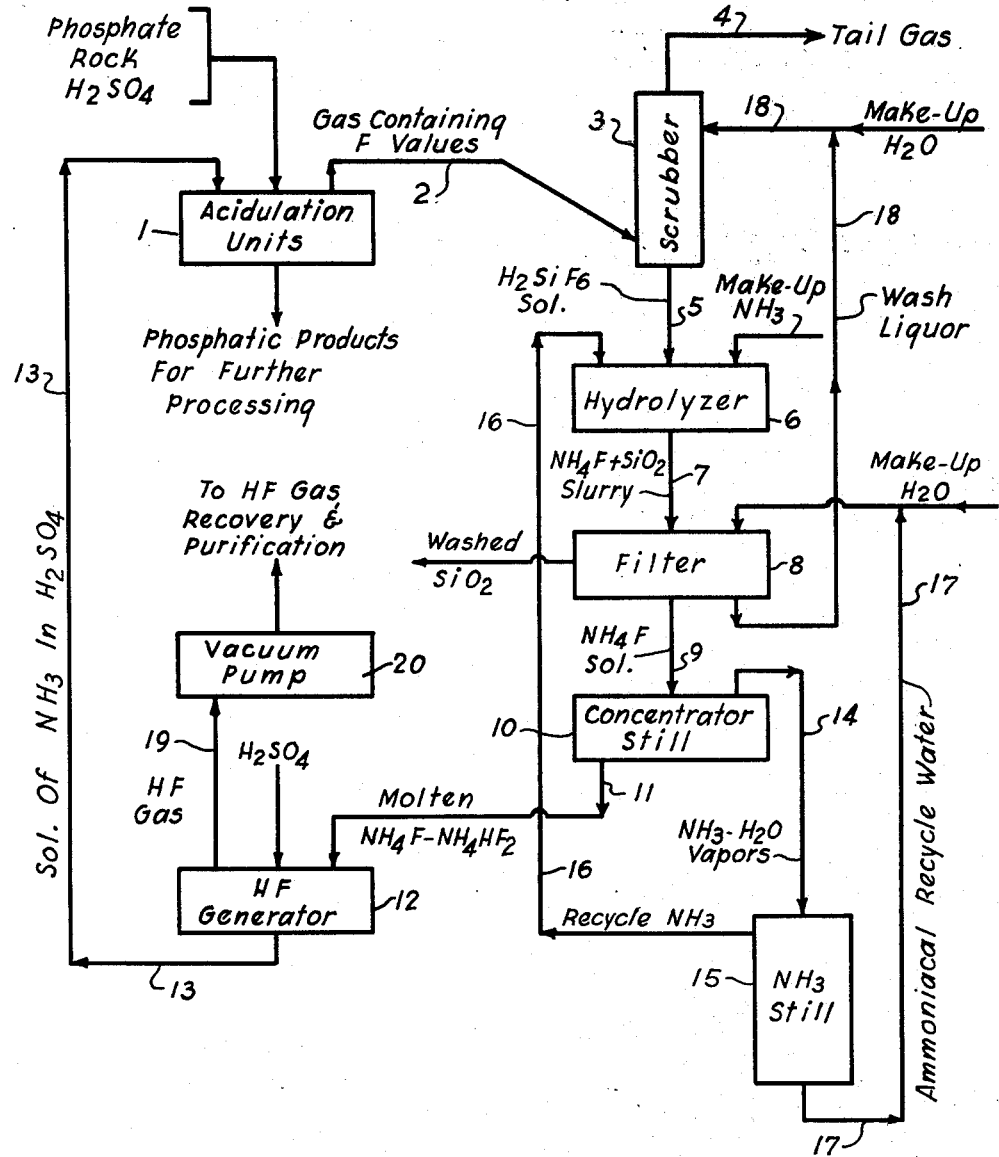

This invention relates to a process for the recovery of hydrogen fluoride, and more particularly relates to a process for recovering hydrogen fluoride from the waste gases produced in the acidulation of phosphate rock.

As is well known, fluorine, generally as a calcium containing fluoride mineral, is present in substantially all of the mineral phosphates or phosphate rock. Generally, such phosphate rock contains as much as three to four percent by weight of fluorine.

When this phosphate rock is acidulated, as, for example, with sulfuric or with phosphoric acid, as in the production of phosphate fertilizers, or wet process phosphoric acid, a considerable portion of the fluorine values is released from the acidulation system as gaseous silicon tetrafluoride. Because of the noxious nature of this gas, it must be treated in some manner so as to avoid contamination of the atmosphere. Accordingly, it is generally customary to pass the gases which result from the acidulation of phosphate rock through water absorption towers or venturi scrubbers to absorb the silicon tetrafluoride, yielding a water solution of fluosilicic acid, as follows:

$$3SiF_4 + 2H_2O \xrightarrow{\text{excess } H_2O} SiO_2 + 2H_2SiF_6$$

The insoluble silica formed by this reaction is then separated out, and the solution of fluosilicic acid is either marketed as such, or is used in the manufacture of various fluosilicates, which latter materials have certain industrial applications.

While there is a limited market for the fluosilicic acid or the fluosilicates derived therefrom, the current market price for such compounds is not sufficiently high to make their production very attractive. It is, therefore, advantageous to be able to recover the fluorine values in the silicon tetrafluoride produced in such processes in a form which commands a higher market price, as, for example, hydrogen fluoride.

Although heretofore numerous processes have been proposed for the recovery of the fluorine values as hydrogen fluoride, such processes invariably require operation at excessively high temperatures, or excessively corrosive conditions, or employ an excessive number of processing steps, or an excessive consumption of raw materials, or a sequence of reactions which individually are not clean-cut and thus provide products and by-products in low yield and of little value due to contaminating impurities. These processes have thus required considerable expenditure both in terms of operating expenses and initial capital investment. For this reason, the prior art processes for recovering hydrogen fluoride from the waste gases resulting from the acidulation of phosphate rock have not been economically attractive.

It is, therefore, an object of the present invention to provide a process for recovering hydrogen fluoride from the waste gases resulting from the acidulation of phosphate rock, which process can be operated with a minimum expenditure for capital investment and operating cost.

A further object of the present invention is to provide a process for recovering hydrogen fluoride from the waste gases from a phosphate rock acidulation process, wherein the raw materials utilized in obtaining the hydrogen fluoride are further utilizable in the phosphate rock acidulation process.

These and other objects of the present invention will become apparent to those skilled in the art from the description of the invention which follows:

The drawing which is attached hereto and forms a part hereof is a schematic flow diagram of a preferred embodiment of the process of the present invention.

The method of the present invention envisions passing the gases evolved during the acidulation of the phosphate rock with sulfuric acid through a scrubber, wherein the fluorine values in said gases are dissolved and form an aqueous solution of fluosilicic acid. The fluosilicic acid solution is then hydrolyzed in the presence of ammonia to form an aqueous solution of ammonium fluoride. The silica formed in this hydrolysis, together with that formed in the absorber, is separated from the aqueous solution of ammonium fluoride. The ammonium fluoride solution is concentrated by distillation to remove a major portion of the water. The resulting concentrate is acidified with an excess of sulfuric acid to form a solution of ammonia in sulfuric acid, plus gaseous hydrogen fluoride. The gaseous hydrogen fluoride is recovered and purified by conventional means and the solution of ammonia in sulfuric acid is used in the phosphate rock acidulation stage of the process.

It is to be understood that as used in the specification and claims, the term "acidulation with sulfuric acid" is intended to include acidulations with sulfuric acid alone, as well as with other acids in combination with sulfuric acid. Exemplary of other acids which may thus be used with sulfuric are phosphoric acid and nitric acid.

By operating the present process in the manner set forth hereinabove, a double utilization is made of both the ammonia and the sulfuric acid. The ammonia is used in the hydrolysis of the fluosilicic acid to silica and ammonium fluoride, and its value as a fertilizer is then recovered when the solution of ammonia in sulfuric acid is used in the phosphate rock acidulation portion of the process. The sulfuric acid is first used to release hydrogen fluoride from the ammonium fluoride, and the residual acid values in the solution of ammonia in sulfuric acid are also used to acidulate phosphate rock. The sulfate values in this solution are used to form calcium sulfate, a valuable function in the production of fertilizers or wet process phosphoric acid from phosphate rock. It is, therefore, evident that passage of the sulfuric acid and ammonia through this process for producing anhydrous hydrogen fluoride does not reduce their value as raw materials in the production of phosphorus-containing materials, particularly fertilizers from phosphate rock. Use of these raw materials in the hydrogen fluoride process is, therefore, achieved without significant costs beyond those for storage and handling. In view of this great advantage in raw material costs, the present process makes it possible to economically obtain hydrogen fluoride from the waste gas stream obtained from the acidulation of phosphate rock.

Considering now the present process in more detail, phosphate rock is acidulated with sulfuric acid. This acidulation is carried out in the conventional manner for producing wet process phosphoric acid or phosphate fertilizers, such as superphosphate. The wet process phosphoric acid is used to acidulate additional rock to make triple superphosphate. The specific manner in which this portion of the process is carried out is believed to be well known to those skilled in the art, and, for this reason, a detailed description of these steps is not deemed to be necessary. Suffice it to say that during the acidulation of the phosphate rock, much of the fluorine values contained in the rock is evolved, predominantly in the form of silicon tetrafluoride. In addition to the silicon tetrafluoride, the gas stream may also contain hydrogen fluoride and carbon dioxide, as well as other gases such as sulfur dioxide. The gases also may be considerably diluted by large quantities of air used for cooling, ventilation or sweep purposes in the acidulation processes.

This gas stream is then passed through a scrubbing apparatus wherein the fluorine values in the gas are dissolved in water to form aqueous fluosilicic acid. The scrubbing apparatus used may be of any suitable design, as, for example, a spray chamber, an eductor, or a venturi type of scrubber. This portion of the process, like the acidulation portion of the process, is generally a conventional part of a phosphate fertilizer plant. Accordingly, specific details of the scrubbing steps and apparatus are not deemed to be necessary, such steps and apparatus being well known to those skilled in the art.

The crude fluosilicic acid resulting from the scrubbing system is then passed into a hydrolyzer where it is treated with ammonia and held at the proper temperature and pH to effect the following reaction:

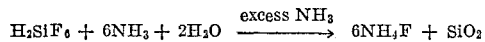

$$H_2SiF_6 + 6NH_3 + 2H_2O \xrightarrow{\text{excess } NH_3} 6NH_4F + SiO_2$$

The slurry, containing ammonium fluoride and silica, which results from the hydrolysis is digested for a sufficient period of time to bring the silica to an easily filterable form. Thereafter, the slurry is filtered to remove the silica. The resulting ammonium fluoride solution obtained from the filter is then passed into a concentrator still.

The silica filter cake which is obtained is washed with ammoniacal wash water as will be described in more detail hereinafter. Preferably, the ammoniacal wash water, after being used to wash the silica filter cake is returned to the scrubbing system to be used as at least a portion of the scrubbing liquor.

In the concentrator still, the ammonium fluoride solution is evaporated to remove a major portion of the water and, if desired, a considerable fraction of the ammonia. If this distillation is carried out at low pressure and temperature, relatively little ammonia is distilled out, and a slurry of solid ammonium fluoride in saturated aqueous ammonium fluoride solution is produced in the concentrator still. Such operation, although offering conditions for minimum corrosion, is subject to the caking and plugging difficulties usually encountered when evaporating to produce thick slurries of highly soluble materials. It is, therefore, preferred that the concentrator still be made from corrosion resistant materials, and that the evaporation be carried out at or near atmospheric pressure. At this pressure, sufficient ammonia is evaporated with the water to result in a completely liquid solution of water, ammonium fluoride and ammonium bifluoride. This avoids the caking and plugging difficulties encountered with slurries. Less sulfuric acid is required to release the hydrogen fluoride from such concentrated solutions of high ammonium bifluoride content. This results in more complete evolution of hydrogen fluoride from the generator, reducing that fraction of the fluoride values which is carried back into the phosphate rock acidulation system. These combined benefits from evaporation at atmospheric pressure are considered to outweigh the disadvantages of fabricating the still from more corrosion resistant materials. Therefore, for ease in handling, it is preferred in this portion of the present process that the operation of the concentrator still be carried out so that the formation of this concentrated solution of water, ammonium fluoride, and ammonium bifluoride is effected. From the concentrator still, the solution is passed into a hydrogen fluoride generator.

In addition to the above solution, there is formed in the concentrator still a gaseous mixture of ammonia and water vapors. The ammonia values in this vapor may be recovered in several ways. In one method of recovery, this gaseous mixture is directed from the concentrator still to an ammonia still wherein it is fractionated to recover the ammonia as gas, which is then recycled into the hydrolyzer to furnish a portion of the ammonia which is needed to effect the formation of the ammonium fluoride. The residue from the ammonia still, which is a water solution of ammonia, is recycled to the filter wherein it is used to wash the silica filter cake. Where it is necessary, additional "make-up" water is added to the ammoniacal recycle water before it is directed into the filter. As has been indicated hereinabove, after washing the silica filter cake, the ammoniacal wash liquor is then recycled into the scrubber system.

As an alternative means for recovery of the ammonia values in the vapors from the concentrator still, these vapors may be condensed and the resulting solution of ammonia in water directed to the phosphate rock acidulation process. This condensate may be used to replace water at points in the process where water input is required. Such points could be the dilution water requirement of the phosphate rock-sulfuric acid mixture for making superphosphate or the water required for washing of the gypsum filter cake in a phosphoric acid process. It may be desirable to neutralize the ammoniacal condensate with sulfuric acid before using it for wash water in the latter case. Such neutralization will prevent ammonia odors and eliminate precipitation of ammonia insoluble materials and the attendant difficulties with slowed filtrations. Whatever the use made of the ammoniacal condensate, its introduction into the acidulation processes will result in inclusion of its ammonia values in the final phosphate product.

A third alternative for recovery of the ammonia values in the vapors from the concentrator still is to direct the uncondensed vapors to the scrubber system. There, the ammonia is absorbed in the acidic scrubber liquor, and much of the water vapor passes out the vent.

In the hydrogen fluoride generator, the molten mixture of ammonium fluoride and ammonium bifluoride is reacted with an excess of sulfuric acid to effect an evolution of hydrogen fluoride gas. It is to be noted that the conditions of temperature, water concentration and the like, which are necessary for evolution of hydrogen fluoride from the generator, as well as similar conditions required in the concentrator still and hydrolyzer, will vary according to the composition of the reaction mixture at each of these stages in the process. Accordingly, it is not possible to give any definite set conditions which must be used in the HF generator, concentrator still, or hydrolyzer, in order to produce the desired results. It is believed to be sufficient to state that preferred conditions are such that in the hydrogen fluoride generator the reaction is carried out using an excess of sulfuric acid; while in the hydrolyzer an excess of ammonia is used, and in the concentrator still the temperature is sufficiently high to remove substantially all of the water from the ammonium fluoride solution and produce a molten mixture of ammonium fluoride and ammonium bifluoride.

From the hydrogen fluoride generator, there is obtained a hydrogen fluoride gas which is directed to conventional recovery and purification systems. In this regard, it has been found to be preferable that a vacuum pump be provided in the HF recovery line from the generator so as to promote a more complete removal of the hydrogen fluoride from the generator.

In addition to the hydrogen fluoride gas, a solution of ammonia in sulfuric acid is also recovered from the hydrogen fluoride generator. This solution is conveyed to the phosphate rock acidulation system. There, the acidity of the solution is utilized in the acidulation of the phosphate rock, the sulfate values are used to form calcium sulfate, and the ammonium values are fixed in the final phosphate product or intermediate. By thus utilizing this solution of ammonia in sulfuric acid in the phosphate rock acidulation process, the double utilization of the ammonia and sulfuric acid is obtained.

The advantages of this double use of ammonia and of sulfuric acid are not confined to production of phosphorus-containing materials for use in fertilizers. In a common process for manufacture of wet process phosphoric acid, phosphate rock is combined with a recycle stream of wet process phosphoric acid and/or recycled slurry of gypsum in phosphoric acid, causing at least partial decomposition of the rock by the phosphoric acid. Sulfuric acid is then added to the mixture which is then digested for sufficient time to:

(1) Convert substantially all of the phosphate values in the rock to phosphoric acid, and (2) Precipitate substantially all of the calcium values in the rock as calcium sulfate.

If the solution of ammonia in sulfuric acid from the hydrogen fluoride generator is substituted for a portion of the sulfuric acid in this process, calcium sulfate is precipitated as usual, and the ammonia stays in the wet process phosphoric acid. If the crude wet process acid is further processed to make diammonium hydrogen phosphate, full value is obtained from the ammonia in the hydrogen fluoride generator effluent. If sodium or potassium phosphates or polyphosphates are produced from the wet process phosphoric acid, the ammonia is boiled out as the alkali metal phosphate solutions are concentrated. This ammonia then is recovered for recycle to the hydrogen fluoride process.

Considering now the drawing, phosphate rock, sulfuric acid, and a solution of ammonia in sulfuric acid are supplied to the acidulation stage of a fertilizer process. The liquid and solid products from these operations are sent for further processing in a manner well known to those skilled in the art. The gases generated in the phosphate rock acidulation units 1, which gases contain fluorine values, are passed through a conduit 2 to the scrubber 3. Within the scrubber 3, the fluorine values in the gas stream are converted to an aqueous solution of fluosilicic acid which passes from the scrubber 3 through a conduit 5 to the hydrolyzer 6. The remaining portion of the gas stream or tail gas, from which the fluorine values have been removed, is removed from the scrubber 3 through the conduit 4. These gases may be vented to the atmosphere.

The scrubbing liquor for the scrubber 3 is introduced through a conduit 18, and is made up of the wash liquor obtained from the filter 8. If necessary, make-up water may be added to this wash liquor to provide a sufficient quantity of solution to effect scrubbing of the gas stream. In the hydrolyzer 6, the fluosilicic acid solution is reacted with water and an excess of ammonia to effect the formation of a slurry of silica in ammonium fluoride solution. A portion of the ammonia used in the hydrolyzer is recycled from the ammonia still 15 through the conduit 16 with additional make-up ammonia being added as required.

From the hydrolyzer 6, the slurry of ammonium fluoride and silica is passed through a conduit 7 to a filter 8, wherein the ammonium fluoride solution is separated from the silica, and is passed through a conduit 9 to the concentrator still 10. Within the filter 8, the silica filter cake is washed with an ammoniacal wash water which is recycled from the ammonia still 15 through conduit 17. From the filter 8, this wash liquor is passed through the conduit 18 to the scrubber 3, as set forth hereinabove. Where it is desired, additional make-up water may be added to the ammoniacal recycle water in the conduit 17 prior to its introduction into the filter 8.

In the concentrator still 10, the ammonium fluoride solution from the filter 8 is heated at a sufficiently high temperature for a sufficient period of time to drive off substantially all of the water and effect the formation of a mixture of ammonium fluoride and ammonium bifluoride. This molten mixture is passed from the concentrator still 10 through the conduit 11 to the HF generator 12. The water vapors, combined with ammonia vapors, produced in the concentrator still by the heating of the ammonium fluoride solution, are passed through a conduit 14 to an ammonia still 15. In this still, a separation is achieved between the ammonia and water, with the gaseous ammonia being passed through the conduit 16 to the hydrolyzer 6, and the ammoniacal water being possed through the conduit 17 to the filter 8, as has been set forth hereinabove.

In the HF generator 12, the molten mixture of ammonium fluoride and ammonium bifluoride from the concentrator still 10 is reacted with an excess of sulfuric acid to effect the evolution of hydrogen fluoride gas and the formation of a solution of ammonia in sulfuric acid. The thus-produced hydrogen fluoride gas is removed from the HF generator through a conduit 19 with the aid of a vacuum pump 20, and is passed to conventional HF gas recovery and purification systems. The solution of ammonia in sulfuric acid is removed from the HF generator by means of a conduit 13, and conveyed to the acidulation units 1, wherein the acid values therein contained are utilized in effecting acidulation of phosphate rock, the sulfate values are used to form calcium sulfate, and the ammonia values are carried on for inclusion in the final fertilizer product.

In the actual operation of the present process using the procedure as shown in the schematic flow diagram of the drawings, phosphate rock is acidulated with sulfuric acid to produce a gas containing 6,000 tons of fluorine, present as 8,220 tons of silicon tetrafluoride. This gas is passed into a scrubber wherein it is contacted with a wash liquor, returned from the filter, which wash liquor contains 8,500 tons of ammonium fluoride, 189 tons of ammonia and 39,208 tons of water. The silicon tetrafluoride in the gas stream is entirely absorbed in the scrubbers, and 3,000 tons of water is evaporated into the tail gas stream. The remaining 53,117 tons of scrubber liquor is run into the hydrolyzer where it is contacted with 5,640 tons of ammonia.

Within the hydrolyzer, a slurry of silica and ammonium fluoride is formed, which slurry is delivered to the filter and contains 4,740 tons of silica, 20,200 tons of ammonium fluoride, 449 tons of ammonia, and 33,368 tons of water, making a total of 58,757 tons.

From the filter, there is delivered to the concentrator still 25,667 tons of undiluted mother liquor which contains 9,594 tons of ammonium fluoride and 213 tons of ammonia dissolved in 15,860 tons of water. The 4,740 tons of silica precipitate removed in the filter is washed with 45,177 tons of water. In removing the silica from the filter, the silica drags out with it 20,000 tons of wash water and 5,630 tons of mother liquor, which contains 47 tons of dissolved ammonia, and 2,106 tons of ammonium fluoride. The wash liquor which is returned to the scrubber from the filter contains 25,177 tons of wash water and 22,720 tons of mother liquor, which, as has been indicated hereinabove, contains dissolved therein 8,500 tons of ammonium fluoride and 189 tons of ammonia.

In the concentrator still, 14,986 tons of water and 1,944 tons of ammonia are evaporated into the ammonia still. The effluent which is passed from the concentrator still to the hydrogen fluoride generator contains 2,072 tons of ammonium fluoride, 5,791 tons of ammonium bifluoride and 874 tons of water.

In the hydrogen fluoride generator, 20,000 tons of 93 percent sulfuric acid is admixed with the molten ammonium fluorides from the concentrator still. Approximately 4,660 tons of hydrogen fluoride, representing about 90 percent of the HF values, is evolved to the HF recovery system as a substantially anhydrous hydrogen fluoride gas. The effluent from the hydrogen fluoride generator, containing 18,600 tons of sulfuric acid, 522 tons of hydrogen fluoride, 2,681 tons of ammonia, and 2,274 tons of water, is conveyed to the phosphate rock acidulation units, wherein the acid values therein contained are utilized in effecting acidulation of phosphate rock, the sulfate values are used to form calcium sulfate, and the ammonia values are carried on for inclusion in the final fertilizer product.

From the above, it is to be noted that when the precipitated silica is removed from the filter, appreciable quantities of ammonium fluoride are removed with it. Accordingly, it is to be understood that the present method also extends to the additional treatment of the silica material for recovery of the fluorine values contained therein. Although various means may be used for recovering these fluorine values, it is preferred that the washed silica be returned to the phosphate rock acidulation system. In this manner, the ammonium values contained in the silica are held for inclusion in the final fertilizer product. The fluorine values are evolved back into the scrubber system as an added evolution of silicon tetrafluoride. Furthermore, the return of this readily available silica to the rock acidulation system provides an additional benefit in the enhancement of fluoride values released and evolved from the rock as silicon tetrafluoride.

The overall process, as has been described in detail hereinabove, makes it possible to obtain the fluorine values present in the off gases from the acidulation of phosphate rock in the form of hydrogen fluoride, rather than fluosilicic acid. Inasmuch as the hydrogen fluoride commands a significantly higher market price than does the fluosilicic acid, the advantages of obtaining the former material rather than the latter are readily apparent. Moreover, by virtue of the fact that the materials used to obtain the hydrogen fluoride, i.e., ammonia and sulfuric acid, are further utilized in the phosphate rock acidulation process, an additional cost advantage is realized in the process, thus making the production of the hydrogen fluoride product even more attractive.

While there have been described various embodiments of the invention, the methods described are not to be understood as limiting the scope of the invention, as it is realized that changes therewithin are possible, and it is further intended that each element recited in the following claims is to be understood as referring to all equivalent elements for accomplishing substantially the same results in substantially the same or equivalent manner, it being intended to cover the invention broadly in whatever form its principle may be utilized.

What is claimed is:

1. In a process for producing a phosphorus-containing material wherein a phosphatic mineral is acidulated with sulfuric acid, and fluorine values in said mineral are recovered as an aqueous solution of fluosilicic acid, the improvement which comprises hydrolyzing the fluosilicic acid solution in the presence of ammonia, and forming a slurry of silica in an aqueous solution of ammonium fluoride, removing the silica therefrom, concentrating the amomnium fluoride solution to remove a major portion of the water and to effect at least a partial conversion of the ammonium fluoride to ammonium bifluoride, acidifying the resulting composition with an excess of sulfuric acid to evolve gaseous hydrogen fluoride and to form a solution of amomnia in sulfuric acid, recovering the thus-formed gaseous hydrogen fluoride, recycling the solution of ammonia in sulfuric acid to the section of the process wherein the phosphorus-containing material is produced and therein utilizing the acid values in the solution of ammonia in sulfuric acid to acidulate additional quantities of phosphatic mineral, while carrying over the ammonia values in said solution of ammonia in sulfuric acid into the final phosphorus-containing material produced.

2. The process as claimed in claim 1 wherein the hydrolysis of the fluosilicic acid is carried out in the presence of an excess of ammonia over that theoretically required to convert all of the fluorine values in the fluosilicic acid to ammonium fluoride.

3. In a process for producing a phosphate fertilizer, wherein a phosphate rock is acidulated with sulfuric acid and fluorine values in such phosphate rock are recovered as an aqueous solution of fluosilicic acid, the improvement which comprises hydrolyzing the fluosilicic acid solution in the presence of ammonia, and forming a slurry of silica in an aqueous solution of ammonium fluoride, the amount of ammonia used being in excess over the theoretical amount required to convert all of the fluorine values in the fluosilicic acid to ammonium fluoride, removing the silica from the ammonium fluoride solution, concentratng the ammonium fluoride solution to remove a major portion of the water and to effect at least a partial conversion of the ammonium fluoride to ammonium bifluoride, acidifying the resulting composition with an excess of sulfuric acid to evolve gaseous hydrogen fluoride, and form a solution of ammonia in sulfuric acid, recovering the thus-formed gaseous hydrogen fluoride, recycling the solution of ammonia in sulfuric acid to the phosphate rock acidulation portion of the process and therein utilizing the acid values in the sulfuric acid solution to acidulate additional quantities of phosphate rock, while carrying over the ammonium values in the acid solution into the final phosphate fertilizer product.

4. In a process for producing a phosphate fertilizer, wherein a phosphate rock is acidulated with sulfuric acid, and fluorine values in the phosphate rock are recovered as an aqueous solution of fluosilicic acid, the improvement which comprises hydrolyzing the fluosilicic acid solution in the presence of ammonia to form a slurry of silica in an aqueous solution of ammonium fluoride, the amount of ammonia used being in excess of the theoretical amount required to convert the fluorine values of the fluosilicic acid to ammonium fluoride, separating the solid silica from the ammonium fluoride solution, concentrating the ammonium fluoride solution to the extent necessary to effect at least a partial conversion of the ammonium fluoride to ammonium bifluoride and form a mixture of ammonium fluoride and ammonium bifluoride, recovering gaseous ammonia from the off gases produced in the concentration of the ammonium fluoride solution and recycling the thus-obtained gaseous ammonia to the hydrolysis portion of the process, acidifying the mixture of ammonium fluoride and ammonium bifluoride obtained from the concentration of the ammonium fluoride solution with an excess of sulfuric acid, evolving gaseous hydrogen fluoride, and forming a solution of ammonia in sulfuric acid, recovering the thus-formed gaseous hydrogen fluoride, recycling the solution of ammonia in sulfuric acid to the phosphate rock acidulation portion of the process, and therein utilizing the acid values in the solution to acidulate additional quantities of phosphate rock, while carrying over the ammonium values in the solution into the final phosphate fertilizer product.

5. The process as claimed in claim 4 wherein the silica precipitate, which is separated from the ammonium fluoride solution, is recycled to the phosphate rock acidulation portion of the process.

6. The process as claimed in claim 4 wherein the sulfate values in the solution of ammonia in sulfuric acid are used to form calcium sulfate in the section of the process wherein the phosphorus-containing material is produced.

7. In a process for producing a phosphate fertilizer, wherein a phosphate rock is acidulated with sulfuric acid, and fluorine values in said phosphate rock are evolved as gases and are absorbed in an aqueous scrubbing liquor to form an aqueous solution of fluosilicic acid, the improvement which comprises hydrolyzing the said aqueous solution of fluosilicic acid in the presence of ammonia, the amount of ammonia being in excess of that theoretically required to convert all of the fluorine values in the fluosilicic acid to ammonium fluoride, forming a slurry of silica in an aqueous solution of ammonium fluoride, separating the solid silica from the said aqueous solution, concentrating the aqueous solution of ammonium fluoride by the application of heat to effect at least a partial conversion of ammonium fluoride to ammonium bifluoride and form a mixture of ammonium fluoride and ammonium bifluoride and a gaseous mixture of ammonia vapors and water vapors, distilling said gaseous mixture to obtain ammonia gas and an ammoniacal water solution, acidifying the mixture of ammonium fluoride and amomnium bifluoride with an excess of sulfuric acid, evolving gaseous hydrogen fluoride and forming a solution of ammonia in sulfuric acid, recovering the gaseous hydrogen fluoride, recycling the solution of ammonia in sulfuric acid to the phosphate rock acidulation portion of the process, and therein utilizing the acid values in the solution to acidulate additional quantities of phosphate rock, while carrying over the ammonium values in the solution into the final phosphate fertilizer product.

8. The proces as claimed in claim 7 wherein the solid silica is separated from the ammonium fluoride solution by filtration.

9. The process as claimed in claim 7 wherein the ammonia produced by the distillation of the gaseous mixture obtained from the concentration of the ammonium fluoride solution is recycled to the hydrolysis portion of the process.

10. The process as claimed in claim 8 wherein the ammonia produced by the distillation of the gaseous mixture obtained from the concentration of the ammonium fluoride solution is recycled to the hydrolysis portion of the process.

11. The process as claimed in claim 10 wherein the ammoniacal water solution obtained by the distillation of the gas mixture from the concentration of the ammonium fluoride solution is recycled to the filtration portion of the process and used to wash the silica precipitate obtained.

12. The process as claimed in claim 11 wherein the liquor used to wash the silica precipitate is recycled to the scrubbing portion of the process and used to absorb the fluorine values in the gases obtained from the phosphate rock acidulation so as to form the fluosilicic acid solution.

References Cited by the Examiner
UNITED STATES PATENTS

| | | | |
|---|---|---|---|
| 2,728,634 | 12/1955 | Miller | 23—153 X |
| 2,981,601 | 4/1961 | Kidde | 23—88 X |
| 3,024,086 | 3/1962 | Cines | 23—153 X |
| 3,089,752 | 5/1963 | Clark | 23—88 |

BENJAMIN HENKIN, *Primary Examiner.*

MAURICE A. BRINDISI, *Examiner.*

E. STERN, *Assistant Examiner.*